United States Patent
Perry et al.

(10) Patent No.: US 9,129,025 B2
(45) Date of Patent: Sep. 8, 2015

(54) AUTOMATICALLY GRANTING ACCESS TO CONTENT IN A MICROBLOG

(71) Applicant: International Business Machines Corporation, Armonk, NY (US)

(72) Inventors: Ethan L. Perry, Lexington, MA (US); Josef Scherpa, Fort Collins, CO (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/744,538

(22) Filed: Jan. 18, 2013

(65) Prior Publication Data
US 2014/0207823 A1    Jul. 24, 2014

(51) Int. Cl.
G06F 17/30 (2006.01)
G06Q 10/10 (2012.01)

(52) U.S. Cl.
CPC .......... *G06F 17/30867* (2013.01); *G06Q 10/10* (2013.01)

(58) Field of Classification Search
None
See application file for complete search history.

(56) References Cited

U.S. PATENT DOCUMENTS

| 8,315,849 | B1 | 11/2012 | Gattani et al. |
| 2008/0177752 | A1* | 7/2008 | Kulkarni et al. ............... 707/10 |
| 2011/0244882 | A1 | 10/2011 | Hancock |
| 2012/0158863 | A1 | 6/2012 | Kikin-Gil et al. |

OTHER PUBLICATIONS

De Cristofaro, Emiliano, et al., "Hummingbird: Privacy at the time of twitter," 2012 IEEE Symposium on Security and Privacy (SP), May 2012.*
Leland Rechis, "Instant Notifications," Twitter Blogs webpage, Nov. 16, 2010.*

* cited by examiner

*Primary Examiner* — Jay Morrison
(74) *Attorney, Agent, or Firm* — Robert A. Voigt, Jr.; Winstead, P.C.

(57) ABSTRACT

A method, system and computer program product for automatically granting access to content referenced in a microblog. A microblog post having content referenced therein is received by a microblog server. The microblog post includes a special character (e.g., "@") designating a user, group or community. Furthermore, the microblog post includes a special character (e.g., "!") designating the content. In response to recognizing the special character designating the content, the microblog server grants access to the designated content to the user, group or community referenced in the microblog post. By including a special character in the microblog post to designate content to be made available to the user, group or community referenced in the microblog post, the user can now designate the content to be made available to the users, groups and/or communities that do not previously have rights to access the content in an easy and efficient manner.

18 Claims, 3 Drawing Sheets

AUTOMATICALLY GRANTING ACCESS TO CONTENT IN A MICROBLOG

TECHNICAL FIELD

The present invention relates generally to microblogging services, and more particularly to automatically granting access to content (e.g., files) referenced in a microblog to persons, groups and/or communities referenced in the microblog.

BACKGROUND

Microblogging is a broadcast medium in the form of blogging. A microblog differs from a traditional blog in that its content is typically smaller in both actual and aggregate file size. Microblogs allow users to exchange small elements of content, such as short sentences, individual images, or video links, to people who are subscribed to their posts or within their community. These small messages are sometimes called microposts.

In order to assist users to find microblog messages that are relevant to them, some social networking and microblogging tools support the use of hashtags and "@mentions." Hashtags are words or phrases prefixed with the symbol "#" to indicate a topic of interest. A "mention" is a means by which a blog post references or links to a user, group or community, such as by identifying the user, group or community following the symbol "@."

While existing microblogging tools use these special characters (e.g., "#," "@") to attract attention, they do not provide a way to guarantee access to the content (e.g., file) referenced in the microblog post to the users or groups or communities that are referenced in the microblog post. Currently, users wishing to share content referenced in the microblog post to particular users that do not currently have access to the content need to add these users to the groups or communities referenced in the microblog post prior to sending the microblog post. Additionally, if a user wishes to mention a person in a microblog post but that user is not yet a member of the group or community referenced in the microblog post, the user would not be able to receive the notification of the microblog post, let alone have access to the content referenced in the microblog post. As a result, there is not currently an efficient process for the user to allow users, groups or communities to have access to the content referenced in a microblog post for those users, groups or communities that do not previously have rights to access the content, despite being referenced in the microblog post.

BRIEF SUMMARY

In one embodiment of the present invention, a method for automatically granting access to content referenced in a microblog comprises receiving a microblog post having content referenced therein, where the microblog post comprises a first character designating a user, a group or a community, and where the microblog post comprises a second character designating the content. The method further comprises recognizing the first character and the second character in the microblog post. Additionally, the method comprises notifying the user, the group or the community designated in the microblog post in response to recognizing the first character in the microblog post. In addition, the method comprises granting, by a processor, access to the designated content to the user, the group or the community designated in the microblog post in response to recognizing the second character in the microblog post.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for automatically granting access to content referenced in a microblog. In one embodiment of the present invention, a microblog post having content (e.g., file) referenced therein is received by a microblog server. The microblog post includes a special character (e.g., "@") designating a user, group or community. Furthermore, the microblog post includes a special character (e.g., "!") designating the content. In response to recognizing the special character (e.g., "!") designating the content, the microblog grants access to the designated content to the user, group or community designated in the microblog post. By including a special character, such as "!", in the microblog post to designate content to be made available to the user, group or community referenced in the microblog post, the user can now designate the content to be made available to the users, groups and/or communities that do not previously have rights to access the content in an easy and efficient manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
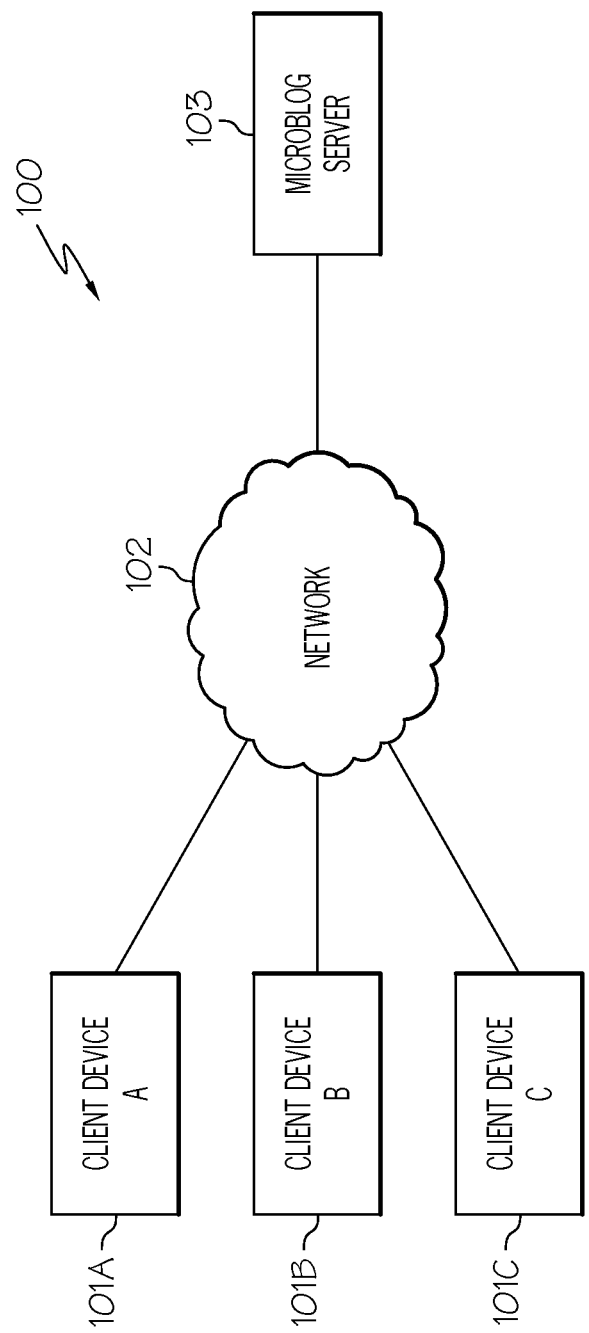
FIG. 1 illustrates a microblogging system configured in accordance with an embodiment of the present invention.

Referring now to the Figures in detail, FIG. 1 illustrates a microblogging system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in microblogging system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a microblogging network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a microblog server 103, which may be a web server configured to offer a microblogging and/or social networking service, enabling users of client devices 101 to send and read other users' posts or microblogs. Microblog server 103 is connected to network 102 by wire or wirelessly. Microblog server 103 is configured to automatically grant access to content referenced in a microblog to all the users, groups and/or communities designated in the microblog through the use of a special character (e.g., "!") designating the content as discussed further below. A description of the hardware configuration of microblog server 103 is provided below in connection with FIG. 2. While FIG. 1 illustrates a single microblog server 103, it is noted for clarity that multiple servers may be used to implement the microblogging and/or social networking service.

System 100 is not to be limited in scope to any one particular network architecture. System 100 may include any number of clients 101, networks 102, and microblog servers 103.

Figure 2:
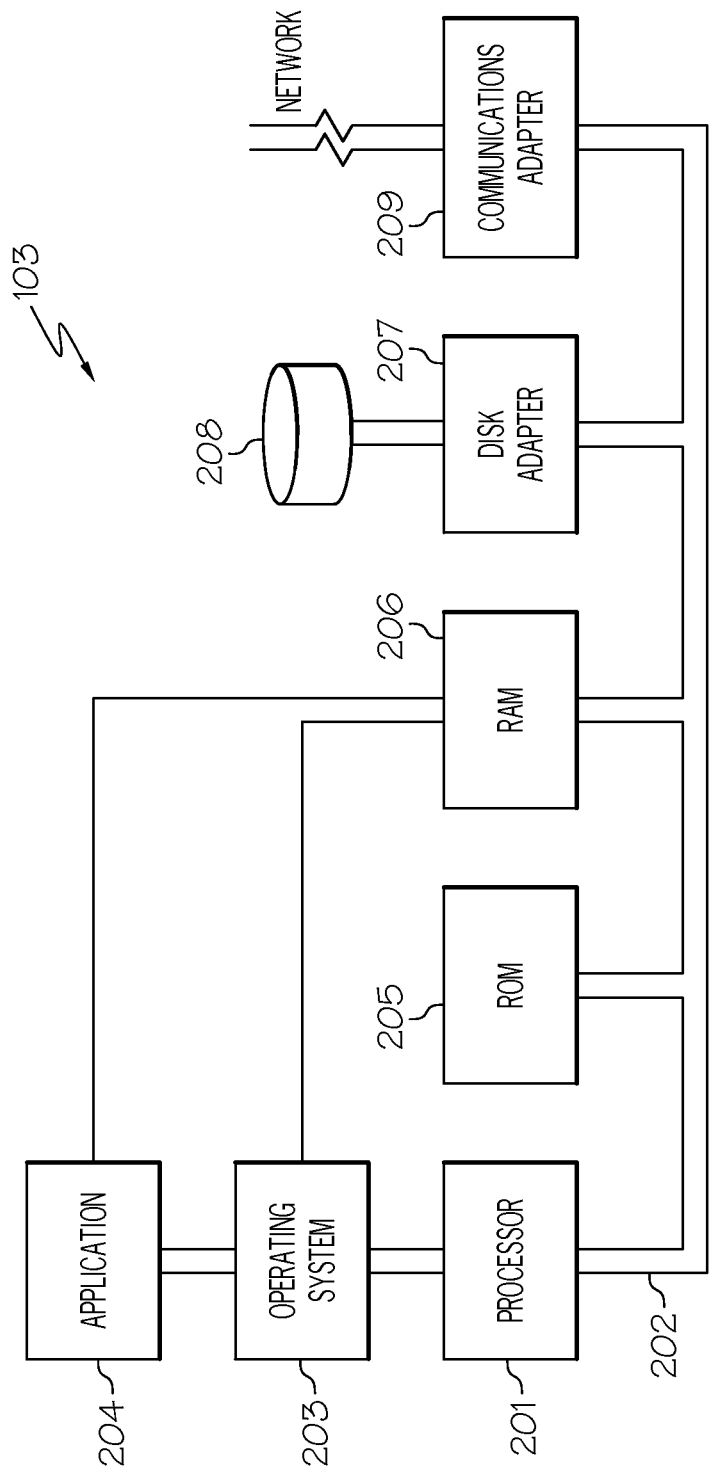
FIG. 2 illustrates a hardware configuration of a microblog server configured in accordance with an embodiment of the present invention.

Referring now to FIG. 2, FIG. 2 illustrates a hardware configuration of microblog server 103 (FIG. 1) which is representative of a hardware environment for practicing the present invention. Referring to FIG. 2, microblog server 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for automatically granting access to content referenced in a microblog to all the users, groups and/or communities designated in the microblog through the use of a special character (e.g., "!") designating the content, as discussed further below in association with FIG. 3.

Referring again to FIG. 2, read-only memory ("ROM") 205 is coupled to system bus 202 and includes a basic input/output system ("BIOS") that controls certain basic functions of microblog server 103. Random access memory ("RAM") 206 and disk adapter 207 are also coupled to system bus 202. It should be noted that software components including operating system 203 and application 204 may be loaded into RAM 206, which may be microblog server's 103 main memory for execution. Disk adapter 207 may be an integrated drive electronics ("IDE") adapter that communicates with a disk unit 208, e.g., disk drive. It is noted that the program for automatically granting access to content referenced in a microblog to all the users, groups and/or communities designated in the microblog through the use of a special character (e.g., "!") designating the content, as discussed further below in association with FIG. 3, may reside in disk unit 208 or in application 204.

Microblog server 103 may further include a communications adapter 209 coupled to bus 202. Communications adapter 209 interconnects bus 202 with an outside network (e.g., network 102 of FIG. 1) thereby allowing microblog server 103 to communicate with client devices 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, while existing microblogging tools use these special characters (e.g., "#," "@") to attract attention, they do not provide a way to guarantee access to the content (e.g., file) referenced in the microblog post to the users or groups or communities that are referenced in the microblog post. Currently, users wishing to share content referenced in the microblog post to particular users that do not currently have access to the content need to add these users to the groups or communities referenced in the microblog post prior to sending the microblog post. Additionally, if a user wishes to mention a person in a microblog post but that user is not yet a member of the group or community referenced in the microblog post, the user would not be able to receive the notification of the microblog post, let alone have access to the content referenced in the microblog post. As a result, there is not currently an efficient process for the user to allow users, groups or communities to have access to the content referenced in a microblog post for those users, groups or communities that do not previously have rights to access the content, despite being referenced in the microblog post.

The principles of the present invention provide a means for automatically granting access to content referenced in a microblog to all the users, groups and/or communities designated in the microblog (even those users, groups and communities that do not previously have rights to access the content) through the use of a special character (e.g., "!") designating the content as discussed further below in association with FIG. 3.

Figure 3:
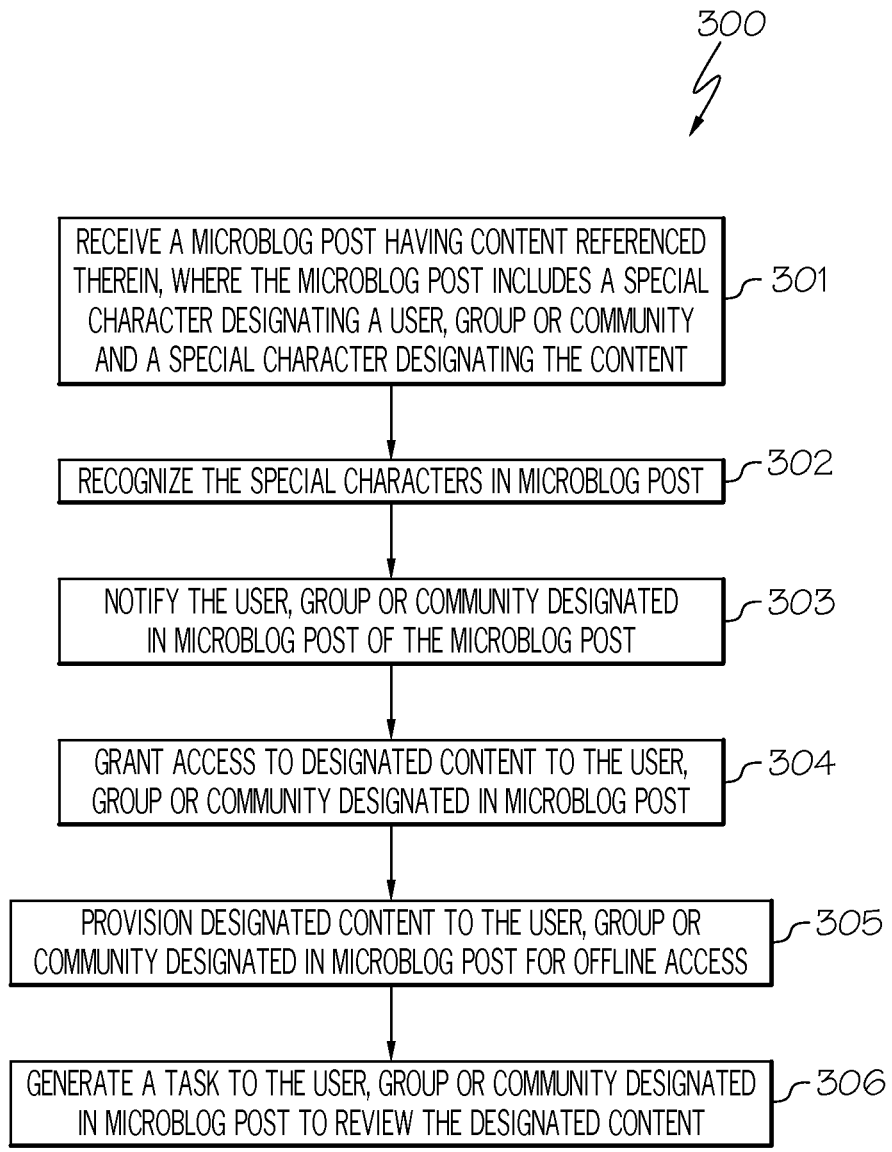
FIG. 3 is a flowchart of a method for automatically granting access to content referenced in a microblog to all the users, groups and/or communities designated in the microblog through the use of a special character designating the content in accordance with an embodiment of the present invention.

FIG. 3 is a flowchart of a method 300 for automatically granting access to content referenced in a microblog to all the users, groups and/or communities designated in the microblog through the use of a special character (e.g., "!") designating the content in accordance with an embodiment of the present invention.

Referring to FIG. 3, in conjunction with FIGS. 1-2, in step 301, microblog server 103 receives a microblog post having content (e.g., file) referenced therein, where the microblog post includes a special character (e.g., "@") designating a user, group or community and a special character (e.g., "!") designating the content. For example, the microblog post of "@JohnSmith please review the !QuarterlyReport draft file" designates John Smith to be notified regarding the QuarterlyReport draft file via the "@" character. Furthermore, the "!" character is used to indicate that John Smith is to have access to the Quarterly Report file. By including a special character, such as "!", in the microblog post to designate content to be made available to the users, groups and/or communities referenced in the microblog post, the user can now designate the content to be made available to the users, groups and/or communities that do not previously have rights to access the content in an easy and efficient manner. It is noted that the principles of the present invention are not limited to the use of the "!" character to designate the content to be made available to the users, groups and/or communities referenced in the microblog post but to include any type of character, user interface affordances, keyboard shortcuts, gestures, etc.

In one embodiment, when the user of client device 101 enters the special character (e.g., "!") to designate content, the user interface may launch a selection menu thereby allowing the user to select the content (e.g., files) to be inserted in the microblog post in response to entering the special character.

In one embodiment, when the designated content is restricted, another special character (e.g., "^") may be used in the microblog post to grant access to the restricted content on a local device, such as the local device of a user referenced in the microblog post. It is noted that the principles of the present invention are not limited to the use of the "^" character to grant access to restricted content on a local device but to include any type of character, user interface affordances, keyboard shortcuts, gestures, etc.

In step 302, microblog server 103 recognizes the special character (e.g., "@") in the microblog post designating the user, group or community and recognizes the special character (e.g., "!") in the microblog post designating the content. In one embodiment, the special character (e.g., "@") designates the user, group or community that is adjacent to the special character in the microblog post (e.g., "@JohnSmith"). In one embodiment, the special character (e.g., "!") designates the content that is adjacent to the special character in the microblog post (e.g., "!QuarterlyReport draft file"). In one embodiment, microblog server 103 recognizes a special character (e.g., "^") in the microblog post that grants access to restricted content on a local device.

In step 303, microblog server 103 notifies the user, group or community designated in the microblog post of the microblog post in response to recognizing the special character (e.g., "@") designating the user, group or community. Referring to the above example, microblog server 103 notifies John Smith about the microblog post referencing the QuarterlyReport draft file.

In step 304, microblog server 103 grants access to the designated content to the user, group or community designated in the microblog post in response to recognizing the special character (e.g., "!") designating the content. In one embodiment, the designated content is accessible online. In one embodiment, microblog server 103 grants access to the designated content to the user, group or community designated in the microblog post by adding the user, group or community designated in the microblog post that did not previously have rights to access the content to an access control list for the designated content. In this manner, the users who did not previously have access to the designated content will now have access to the designated content. Users, groups and communities that previously had rights to access the content may not need to be added to the access control list for the designated content since they would already be listed.

Optionally, in step 305, microblog server 103 provisions the designated content to the user, group or community designated in the microblog post for offline access. In one embodiment, when the content is restricted, the restricted content is accessible offline, such as on a local device, in response to the use of a special character (e.g., "^") in the microblog post granting access to the restricted content on the local device.

Furthermore, optionally, in step 306, microblog server 103 generates a task to the user, group or community designated in the microblog post to review the designated content.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for automatically granting access to content referenced in a microblog, the method comprising:
   receiving a microblog post having content referenced therein, wherein said microblog post comprises a first character designating a user, a group or a community, wherein said microblog post comprises a second character designating said content;
   recognizing said first character and said second character in said microblog post;
   notifying said user, said group or said community designated in said microblog post of said microblog post in response to recognizing said first character in said microblog post; and
   granting, by a processor, access to said designated content to said user, said group or said community designated in said microblog post in response to recognizing said second character in said microblog post.

2. The method as recited in claim 1 further comprising:
   adding said user, said group or said community designated in said microblog post to an access control list for said designated content in response to recognizing said second character in said microblog post.

3. The method as recited in claim 1, wherein said second character is adjacent to said designated content in said microblog post.

4. The method as recited in claim 1 further comprising:
   provisioning said designated content to said user, said group or said community designated in said microblog post for offline access.

5. The method as recited in claim 1 further comprising:
   generating a task to said user, said group or said community designated in said microblog post to review said designated content.

6. The method as recited in claim 1, wherein said designated content is restricted, wherein said microblog post comprises a third character granting access to said restricted content on a local device.

7. A computer program product embodied in a non-transitory computer readable storage medium for automatically granting access to content referenced in a microblog, the computer program product comprising the programming instructions for:
   receiving a microblog post having content referenced therein, wherein said microblog post comprises a first character designating a user, a group or a community, wherein said microblog post comprises a second character designating said content;
   recognizing said first character and said second character in said microblog post;
   notifying said user, said group or said community designated in said microblog post of said microblog post in response to recognizing said first character in said microblog post; and
   granting access to said designated content to said user, said group or said community designated in said microblog post in response to recognizing said second character in said microblog post.

8. The computer program product as recited in claim 7 further comprising the programming instructions for:
   adding said user, said group or said community designated in said microblog post to an access control list for said designated content in response to recognizing said second character in said microblog post.

9. The computer program product as recited in claim 7, wherein said second character is adjacent to said designated content in said microblog post.

10. The computer program product as recited in claim 7 further comprising the programming instructions for:
    provisioning said designated content to said user, said group or said community designated in said microblog post for offline access.

11. The computer program product as recited in claim 7 further comprising the programming instructions for:
    generating a task to said user, said group or said community designated in said microblog post to review said designated content.

12. The computer program product as recited in claim 7, wherein said designated content is restricted, wherein said microblog post comprises a third character granting access to said restricted content on a local device.

13. A system, comprising:
   a memory unit for storing a computer program for automatically granting access to content referenced in a microblog; and
   a processor coupled to said memory unit, wherein said processor, responsive to said computer program, comprises:
      circuitry for receiving a microblog post having content referenced therein, wherein said microblog post comprises a first character designating a user, a group or a community, wherein said microblog post comprises a second character designating said content;

circuitry for recognizing said first character and said second character in said microblog post;

circuitry for notifying said user, said group or said community designated in said microblog post of said microblog post in response to recognizing said first character in said microblog post; and circuitry for granting access to said designated content to said user, said group or said community designated in said microblog post in response to recognizing said second character in said microblog post.

14. The system as recited in claim 13, wherein said processor further comprises:

circuitry for adding said user, said group or said community designated in said microblog post to an access control list for said designated content in response to recognizing said second character in said microblog post.

15. The system as recited in claim 13, wherein said second character is adjacent to said designated content in said microblog post.

16. The system as recited in claim 13, wherein said processor further comprises:

circuitry for provisioning said designated content to said user, said group or said community designated in said microblog post for offline access.

17. The system as recited in claim 13, wherein said processor further comprises:

circuitry for generating a task to said user, said group or said community designated in said microblog post to review said designated content.

18. The system as recited in claim 13, wherein said designated content is restricted, wherein said microblog post comprises a third character granting access to said restricted content on a local device.

* * * * *